Sept. 26, 1961     N. E. BOUGHTON     3,001,317
VIBRATING FISH POLE SUPPORT
Filed May 21, 1959
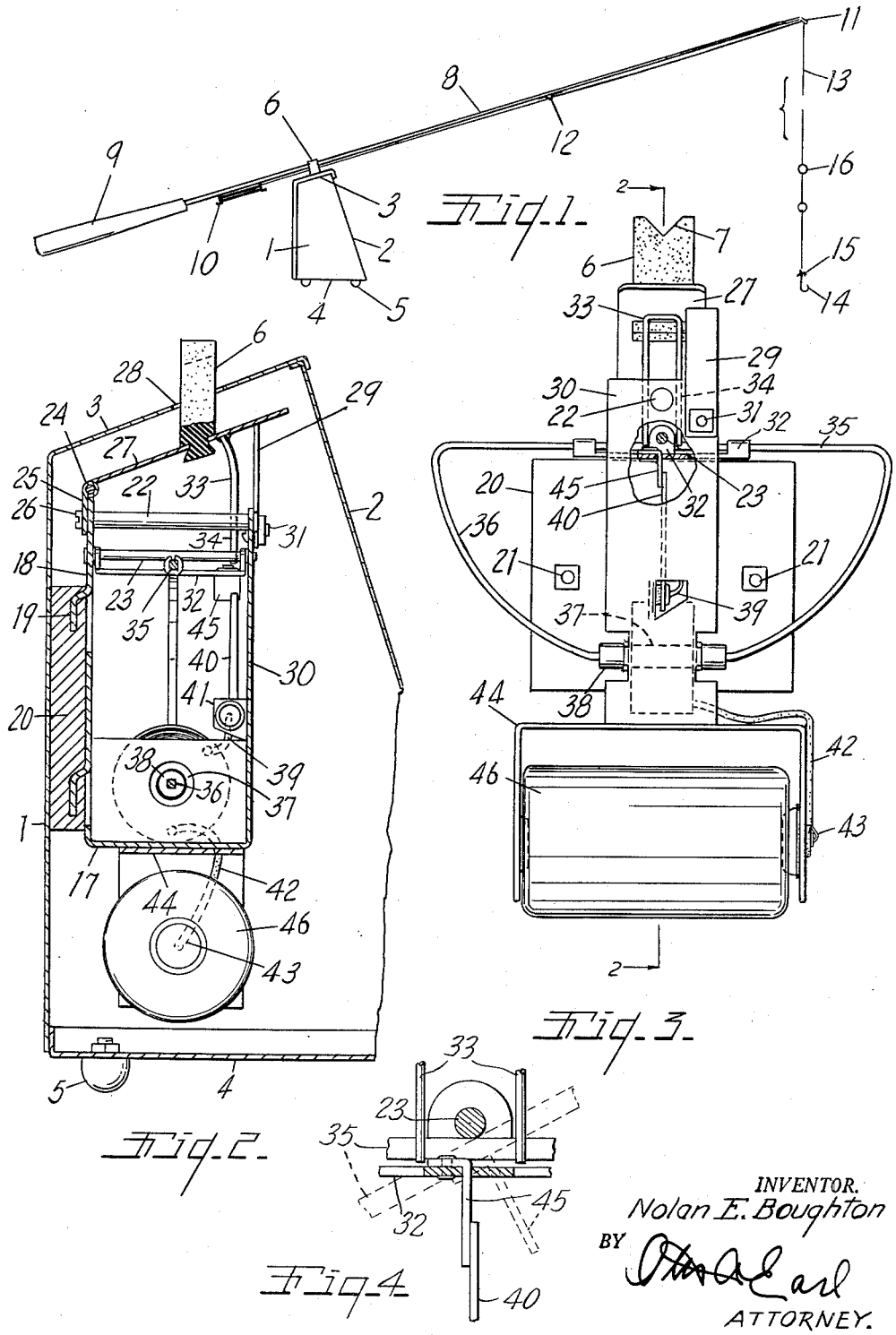
INVENTOR.
Nolan E. Boughton
BY
ATTORNEY.

3,001,317
VIBRATING FISH POLE SUPPORT
Nolan E. Boughton, 1003 Walnut St., Three Rivers, Mich.
Filed May 21, 1959, Ser. No. 814,867
6 Claims. (Cl. 43—19.2)

This invention relates to a fish pole or rod support and vibrator.

The principal objects of this invention are:

First, to provide a support for a fish pole or rod which continuously vibrates or oscillates the line thereby imparting to the fish hook or lure, a jiggling or oscillating movement in the water.

Second, to provide a vibratory pole or rod support having the above advantage which is light in weight, relatively inexpensive in its parts and which will operate for a relatively long period of time on the relatively small amount of current, for example, such as supplied by a flash light battery.

Third, to provide a vibratory support which when properly set supports and vibrates the pole or rod without the manipulating aid of the fisherman.

Objects relating to details and economies of the invention will appear from the description to follow. The invention is defined and pointed out in the claims.

A preferred embodiment of the invention is illustrated in the accompanying drawing, in which:

FIG. 1 is a conventional side elevational view of a fishing pole and line in their operative relation to the vibratory support of my invention.

FIG. 2 is an enlarged fragmentary view in vertical section on a line corresponding to the broken line 2—2 of FIG. 3.

FIG. 3 is a fragmentary rear elevational view of the vibratory mechanism of the support of the embodiment illustrated.

FIG. 4 is a fragmentary vertical section illustrating the coacting functioning relation of certain of the parts, the movement thereof being indicated by dotted lines.

It will be understood that I have not attempted to illustrate the pole or rod and line and the support other than to show their operative relation in use.

The support of my invention is well adapted for so-called ice fishing but it may be used in connection with any supporting surface, for example, it may be mounted on a dock or on the seat of a boat or on other suitably located supporting surfaces.

The support of the embodiment illustrated comprises a housing 1, desirably formed of sheet metal or other light material and including a rear wall 2. The top wall 3 of the support is inclined rearwardly and the bottom wall 4 is dimensioned to stabilize the support. The feet 5 are desirably of non-slipping material, that is, material which has a frictional engagement with the surface on which the support is positioned. The movable rod support 6 which is desirably made of rubber or other light resilient material projects upwardly through the top wall 3 and is notched at 7 to provide a seat or rest for a pole 8. The pole illustrated is provided with a hand piece 9.

In the illustration the line supporting brackets 10 are disposed between the grip 9 and the support. The fishing pole is provided with a line eye 11 at its outer end and an eye 12 spaced inwardly from the end of the pole. The fish line 13 is wove through these eyes 11 and 12 and, as illustrated, is provided with a hook 14 and commonly with a lure 15 and sinkers 16, all conventionally illustrated.

In use, the operator may grasp the handle 9 of the fish pole allowing it to rest upon the vibratory support and the pole may be lifted from the support in the event of a strike, that is, the support in no wise interferes with the usual manipulation of the pole in the event of a strike and the landing of a fish.

In the accompanying drawing I have illustrated the line brackets 10 but it will be understood that the pole or rod may be equipped with any desirable type of reel.

The mechanism for vibrating the pole 8 comprises a U-shaped supporting frame 17, the front arm of which has offset downwardly projecting ears or lugs 19 which engage the mounting pad 20 secured to the front wall 1 of the housing as by means of the bolts 21. The upper ends of the uprights of the U-shaped frame are connected by the cross bar 22 and the rock shaft 23 is rotatably mounted below the cross bar 22. The hinge-like member 24 has one leaf 25 thereof secured to the upright 18 of the frame by means of the screw 26 and the other leaf or member 27 projects upwardly and rearwardly within the housing and provides a support for the pole rest 6. The rest 6 projects through a hole 28 in the top wall 3 of the housing to supportedly receive a pole as is illustrated in FIG. 1. In the lowered or rest position the member 27 rests upon a support 29 provided therefor and projecting upwardly from the rear arm portion 30 of the frame to which it is secured by the bolt 31.

To vibrate or jiggle the pole rest 6 the rock shaft 23 is provided with a saddle 32 projecting to each side of the shaft and is oscillated as will be hereinafter pointed out. The yoke-like arm 33 is secured to the underside of the member 27 and depending portions 34 thereof project downwardly on opposite sides of the cross bar 22 to be engaged and raised by the saddle 32 as it is oscillated by the rock shaft 23. Means for oscillating the rock shaft comprise the cross bar 35 having the downwardly extending bow 36 secured to the ends thereof, the cross bar being fixedly secured to the saddle 32.

Mounted in the base of the U-shaped frame 17 is an insulating core element 37 having an electrical coil wound therearound. The bow 36 passes through the center of the coil and the core 37 and the center of the bow is provided with a permanent magnet 38, the weight of which biases the cross bar 35 and the saddle 32 to horizontal position. One end of the coil wound around the core 37 is connected by the lead wire 39 to a springable contact 40 mounted on an ear 41 struck forwardly from the rear arm of the U-shaped frame. The other end of the coil is connected by the lead wire 42 to an insulated terminal 43 carried by one side of a battery bracket 44 on the underside of the frame 17. The springable contact 40 coacts with a projecting contact 45 swingably mounted on the saddle 32 so that as the saddle oscillates with the rock shaft 23 the contacts 40 and 45 meet momentarily as the cross bar and saddle pass the horizontal position. The swinging contact 45 is electrically connected through the metal of the saddle and the rock shaft and frame to the battery support bracket 44. The bracket 44 supports a common dry cell or flashlight battery 46 with its terminals connected to the frame and bracket 44 on one end and to the insulated terminal 43 on the other end. The motor including the frame 17 and the rock shaft, bow, coil, battery connections and terminals 40 and 45 is a commercially available article so is not described in greater detail.

The additions of the present invention to the commercial motor are the hinge 25—27 with its yoke 33 that coacts with the saddle and the pole rest 6 which is carried by the movable leaf of the hinge. The support 29 for the hinge leaf 27 is also an added part of the invention.

When the battery 46 is installed in the bracket 44 and the housing 1 is supported along side of a hole in the ice an upright position as is illustrated, the saddle 32 and bow 36 assume an intermediate neutral position due to the force of gravity on the magnet 38, this closes the terminals 40 and 45 causing the coil to be energized so that the magnetic field of the coil repels the magnet 38. This tilts the cross bar 35 and the saddle 32 to break the energizing circuit at the terminals 40 and 45 so that the magnet swings back by gravity through the core in the coil. The subsequent reclosing of the terminals 40 and 45 reenergizes the coil to again repel the magnet 36, this is done in an opposite direction through the core and coil so that a continuing oscillation of the saddle is provided. Each time the saddle tilts with the rock shaft it engages and lifts one finger of the yoke 33 so that the leaf 27 and pole rest 6 are moved upwardly and downwardly at a constant and desirable frequency. The resulting movement of the lure 15 attracts the fish to the hook 14.

I have illustrated and described a highly practical embodiment of my invention. I have not attempted to illustrate or describe other embodiments which I contemplate as it is believed that this disclosure will enable those skilled in the art to embody my invention as may be desirable.

What is claimed as new is:

1. A vibratory support for a fish pole comprising a case including an upright wall and a top wall, an electro-magnetic motor mounted on said upright wall and having a horizontal rock shaft, an electro-magnetic coil below said shaft, a bow secured transversely to the shaft and extending through the coil, a magnetizable weight carried by the bow and biasing the rock shaft to neutral position with the weight in the coil, a switch actuated by the rock shaft and closed in the neutral position of the shaft, a saddle secured to the rock shaft and projecting laterally to each side thereof, a leaf hingedly connected to said case and swingable in a vertical plane over said rock shaft, a fixed support on said motor limiting downward motion of said leaf, a forked actuating member secured to said leaf and engageable with said saddle on opposite sides of said rock shaft as said rock shaft oscillates to raise said leaf, a rubber pole rest secured to said leaf and projecting through said top wall, and a battery mounted on the frame of said motor and connectable through said switch to said coil.

2. A vibratory support for a fish pole comprising a case including an upright wall and a top wall, an electro-magnetic motor mounted on said upright wall and having a horizontal rock shaft, an electro-magnetic coil below said shaft, a bow secured transversely to the shaft and extending through the coil, a magnetizable weight carried by the bow and biasing the rock shaft to neutral position with the weight in the coil, a switch actuated by the rock shaft and closed in the neutral position of the shaft, a saddle secured to the rock shaft and projecting laterally to one side thereof, a leaf hingedly connected to said case and swingable in a vertical plane over said rock shaft, a fixed support limiting downward motion of said leaf, an actuating member secured to said leaf and engageable with said saddle as said rock shaft oscillates to raise said leaf, a pole rest secured to said leaf and projecting through said top wall, and a battery mounted on the frame of said motor and connectable through said switch to said coil.

3. A portable vibratory support for a fish pole comprising a body member, an electro-magnetic motor mounted on said body member and having a horizontal rock shaft, an electro-magnetic coil below said shaft, a bow secured transversely to the shaft and extending through the coil, a magnetizable weight carried by the bow and biasing the rock shaft to neutral position with the weight of the coil, a switch actuated by the rock shaft and closed in the neutral position of the shaft, a saddle secured to the rock shaft and projecting laterally to one side thereof, a leaf hingedly supported in said body member and swingable in a vertical plane over said rock shaft, a fixed support limiting downward motion of said leaf, an actuating member secured to said leaf and engaged by said saddle as said rock shaft oscillates to raise said leaf, a pole rest secured to said leaf and projecting through said top wall, and a battery mounted on the frame of said motor and connectable through said switch to said coil.

4. A vibratory support for a fish pole comprising a body member, an electro-magnetic motor mounted on said support and having a horizontally disposed rock shaft, an electro-magnetic coil below said shaft, a bow secured transversely to the shaft and extending through the coil, a magnetizable weight carried by the bow and biasing the rock shaft to neutral position with the weight in the coil, a switch actuated by the rock shaft and closed in the neutral position of the shaft, a saddle secured to the rock shaft and projecting laterally to one side thereof, a pole support member swingable in a vertical plane over said rock shaft, a stop limiting downward motion of said pole support member, an actuating member secured to said pole support and engageable with said saddle as said rock shaft oscillates to raise said support member, a pole rest secured to said support member, and a holder for a battery mounted on the frame of said motor and having battery contacts connectable through said switch to said coil.

5. A vibratory support for a fish pole or rod comprising a body member, an electro magnetic motor mounted on said body member and having a horizontally disposed rock shaft, an electro magnetic coil and a rock member secured transversely of the shaft and extending through the coil, a magnetizable weight carried by said rock member and biasing the rock member to neutral position by the weight in the coil, a switch actuated by said rock shaft and closed in the neutral position of the shaft, an upwardly projecting and movable pole seat member and operating connections between said pole seat member to said rock shaft.

6. A vibratory support for a fish pole or rod comprising a body member, an electro magnetic motor mounted on said body member and having a horizontally disposed rock shaft, an electro magnetic coil disposed below said rock shaft with a bow secured transversely to the shaft and extending through the coil, a magnetizable weight carried by said bow and biasing the bow to neutral position with the weight in the coil, a switch actuated by said rock shaft and closed in neutral position of the shaft, a reciprocable supported pole seat member, and operating connections for said pole seat member to said rock shaft.

References Cited in the file of this patent

UNITED STATES PATENTS

| | | |
|---|---|---|
| 2,746,198 | Smith | May 22, 1956 |
| 2,758,407 | Speidell | Aug. 4, 1956 |
| 2,861,378 | Bell | Nov. 26, 1958 |